United States Patent
Tian et al.

(10) Patent No.: US 12,348,329 B2
(45) Date of Patent: Jul. 1, 2025

(54) METHOD, APPARATUS, AND DEVICE FOR LOAD BALANCING IN BIT INDEX EXPLICIT REPLICATION NETWORK

(71) Applicant: Huawei Technologies Co., Ltd., Shenzhen (CN)

(72) Inventors: Taixu Tian, Dongguan (CN); Yang Xia, Beijing (CN); Jingrong Xie, Beijing (CN); Bing Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 17/735,944

(22) Filed: May 3, 2022

(65) Prior Publication Data

US 2022/0263760 A1    Aug. 18, 2022

Related U.S. Application Data

(63) Continuation of application No. PCT/CN2020/117863, filed on Sep. 25, 2020.

(30) Foreign Application Priority Data

Nov. 4, 2019   (CN) .................. 201911066789.X
Feb. 28, 2020  (CN) .................. 202010130456.5

(51) Int. Cl.
*H04L 12/18* (2006.01)
*H04L 45/24* (2022.01)
(Continued)

(52) U.S. Cl.
CPC .......... *H04L 12/1881* (2013.01); *H04L 45/24* (2013.01); *H04L 45/48* (2013.01); *H04L 45/745* (2013.01); *H04L 47/125* (2013.01)

(58) Field of Classification Search
CPC ..... H04L 12/1881; H04L 45/16; H04L 45/24; H04L 45/34; H04L 45/48; H04L 45/54; H04L 45/742; H04L 45/745; H04L 47/125
See application file for complete search history.

(56) References Cited

U.S. PATENT DOCUMENTS

| | | | |
|---|---|---|---|
| 2015/0131658 A1 | 5/2015 | Wijnands et al. | |
| 2016/0119159 A1* | 4/2016 | Zhao | H04L 47/15 370/390 |

(Continued)

FOREIGN PATENT DOCUMENTS

| | | |
|---|---|---|
| CN | 106656524 A | 5/2017 |
| CN | 107968750 A | 4/2018 |

(Continued)

OTHER PUBLICATIONS

Desmouceaux et al., "Reliable Multicast with B.I.E.R.", Journal of Communications and Networks, vol. 20, No. 2, Apr. 2018, pp. 182-197 (Year: 2018).*

(Continued)

*Primary Examiner* — Shah M Rahman
(74) *Attorney, Agent, or Firm* — Leydig, Voit & Mayer, Ltd.

(57) ABSTRACT

A method for load balancing in a bit index explicit replication (BIER) network includes: a network device obtains a BIER packet, and determines, based on an identifier in the BIER packet, a target next-hop node that reaches a destination address of the first BIER packet from a plurality of next-hop nodes of the network device. Then, the network device generates a target forwarding table based on the target next-hop node, and forwards the first BIER packet based on the target forwarding table. A control plane does not perform load balancing on a BIER packet in a manner of delivering a large quantity of load balancing tables to a (Continued)

forwarding plane, but the forwarding plane of the network device generates the target forwarding table to perform load balancing on the BIER packet.

20 Claims, 9 Drawing Sheets

(51) Int. Cl.
  *H04L 45/48* (2022.01)
  *H04L 45/745* (2022.01)
  *H04L 47/125* (2022.01)

(56) References Cited

U.S. PATENT DOCUMENTS

| | | | | |
|---|---|---|---|---|
| 2016/0127139 A1* | 5/2016 | Tian | ........................ | H04L 45/16 370/390 |
| 2016/0127142 A1* | 5/2016 | Tian | ........................ | H04L 45/50 370/390 |
| 2016/0134518 A1 | 5/2016 | Callon et al. | | |
| 2016/0134535 A1* | 5/2016 | Callon | .................... | H04L 45/74 370/390 |
| 2016/0254988 A1* | 9/2016 | Eckert | .................... | H04L 69/22 370/390 |
| 2017/0324575 A1* | 11/2017 | Wijnands | ................ | H04L 45/16 |
| 2018/0167311 A1* | 6/2018 | Hasani | .................... | H04L 45/16 |
| 2018/0287935 A1* | 10/2018 | Wang | .................. | H04L 12/4625 |
| 2018/0316520 A1* | 11/2018 | Wijnands | ............ | H04L 45/7452 |
| 2020/0120013 A1* | 4/2020 | Goud Gadela | ......... | H04L 49/25 |

FOREIGN PATENT DOCUMENTS

| | | | | |
|---|---|---|---|---|
| CN | 109246017 A | * | 1/2019 | ............. H04L 45/16 |
| CN | 109756425 A | | 5/2019 | |
| CN | 112769745 A | * | 5/2021 | ............. H04L 12/18 |

OTHER PUBLICATIONS

Xie et al., "Use of BIER Entropy for Data Center CLOS Networks; draft-xie-bier-entropy-staged-dc-clos-00," Network Working Group, Internet-Draft, Internet Engineering Task Force (IETF), Total 11 pages (Jul. 2018).

Wijnands, Ed. et al., "Multicast Using Bit Index Explicit Replication (BIER)," Internet Engineering Task Force (IETF), Request for Comments: 8279, Category: Experimental, pp. 1-43 (Nov. 2017).

Wijnands, Ed. et al., "Encapsulation for Bit Index Explicit Replication (BIER) in MPLS and Non-MPLS Networks," Internet Engineering Task Force (IETF), Request for Comments: 8296, Category: Experimental, pp. 1-24 (Jan. 2018).

* cited by examiner

US 12,348,329 B2

METHOD, APPARATUS, AND DEVICE FOR LOAD BALANCING IN BIT INDEX EXPLICIT REPLICATION NETWORK

CROSS-REFERENCE TO RELATED APPLICATIONS

This application is a continuation of International Application No. PCT/CN2020/117863, filed on Sep. 25, 2020, which claims priority to Chinese Patent Application No. 201911066789.X, filed on Nov. 4, 2019 and Chinese Patent Application No. 202010130456.5, filed on Feb. 28, 2020. All of the aforementioned patent applications are hereby incorporated by reference in their entireties.

TECHNICAL FIELD

This application relates to the communication field, and in particular, to a method, an apparatus, and a device for load balancing in a bit index explicit replication network.

BACKGROUND

The Requirement For Comments (RFC) 8279 provides a solution for multi-table load balancing using bit index explicit replication (BIER). The solution includes: A control plane of a network device delivers a plurality of bit index forwarding tables (BIFTs) used for load balancing to a forwarding plane of the network device, and the forwarding plane performs hash based on a packet feature, selects a BIFT, and then forwards a BIER packet. However, more BIFTs are required and delivered for load balancing if there are more links. When a link fails, traffic forward switching needs to wait until the control plane refreshes the BIFT. As a result, a link switching rate is affected by the control plane refreshing the BIFT. When a link recovers or switches back, a packet loss or packet addition during back switching may occur because all BIFTs are refreshed.

SUMMARY

This application provides a method, an apparatus, and a device for load balancing in a BIER network, to improve efficiency of forwarding a BIER packet by a network device.

According to a first aspect, a method for load balancing in a BIER network is provided. The method includes: A first network device obtains a first BIER packet, and determines, based on an identifier in the first BIER packet, a target next-hop node that reaches a destination address of the first BIER packet from a plurality of next-hop nodes of the first network device. Then, the first network device generates a target forwarding table based on the target next-hop node, and forwards the first BIER packet based on the target forwarding table. Steps in the method may be implemented by a forwarding plane of the first network device.

The equal cost multi path (ECMP) means that there are a plurality of paths with identical overheads to a same destination address. In this case, a packet sent by a network device to a same destination address has a plurality of next-hop nodes. In this application, the first network device may be any node for which a BIER ECMP load balancing enabling function is configured. For example, the first network device has a BIER protocol use capability, a BIER forwarding capability, and a forwarding capability of BIER encapsulation, for example, multi-protocol label switching (MPLS) encapsulation, Ethernet encapsulation, or internet protocol version 6 (IPv6) encapsulation. An encapsulation type for BIER forwarding is not limited in this embodiment of this application. In addition, the first network device in this embodiment of this application may be a data communication device such as a router or a switch.

The first network device determines the target next-hop node based on the identifier in the BIER packet, and further generates the target forwarding table. Therefore, ECMP load balancing is not performed by a control plane of the first network device in a multi-table manner, but is performed based on an ECMP link of each bit forwarding egress router (BFER) indicated by the identifier such as a bit string in the BIER packet, so that load balancing precision of multicast is the same as that of unicast. In addition, when a load balancing link fails and recovers, a packet loss and packet addition do not occur, and when the load balancing link fails and recovers, BFER traffic that is unrelated to the failed link is not in out of order, so that route selection of each BFER is independent and does not affect each other, and forward switching and back switching performance that is the same as that of unicast is achieved.

In a possible implementation, the first network device may obtain a bit index forwarding table, for example, obtain the bit index forwarding table from the control plane of the first network device. The bit index forwarding table includes a forwarding bit mask and an identifier of a next-hop node corresponding to the forwarding bit mask. The bit index forwarding table is used to indicate the network device to forward the BIER packet. An implementation in which the first network device determines, based on an identifier in the first BIER packet, a target next-hop node that reaches a destination address of the first BIER packet from a plurality of next-hop nodes of the first network device specifically includes: The first network device may query the bit index forwarding table based on the identifier in the first BIER packet, to obtain the target next-hop node that reaches the destination address of the first BIER packet from the plurality of next-hop nodes of the first network device.

In the foregoing solution, the bit index forwarding table does not need to be split into a plurality of ECMP tables by using the control plane and delivered to the forwarding plane for load balancing, so that a quantity of bit index forwarding tables delivered by the control plane can be greatly reduced, thereby improving forwarding efficiency of the network device. In addition, the network device may be classified into different sets, and the set may be identified by using a set identifier (SI). Therefore, one SI may require only one BIFT, thereby greatly saving storage space of the first network device.

In a possible implementation, the identifier in the first BIER packet is a bit string, and each bit in the bit string is used to identify a bit forwarding egress router (BFER). For example, a bit value of a least significant (rightmost) bit of the bit string is 1 to identify a node of BFR-id=1. The bit string includes at least one target bit of a first value, and the first value may be set to 1. For example, a bit whose bit value is 1 is the target bit. When the bit string is 0111, it indicates that the bit string includes three target bits. An implementation in which the first network device queries the bit index forwarding table of the first network device based on the identifier in the first BIER packet, to obtain the target next-hop node that reaches the destination address of the first BIER packet from the plurality of next-hop nodes of the first network device includes: querying the bit index forwarding table of the first network device based on the bit string, to obtain a next-hop node corresponding to the target bit in the plurality of next-hop nodes of the first network device. Then, the first network device determines, based on the next-hop node corresponding to the target bit, the target next-hop node that reaches the destination address of the first BIER packet.

In the foregoing solution, the next-hop node corresponding to the target bit may be obtained in the plurality of next-hop nodes of the first network device by using the forwarding plane of the network device based on the bit string in the BIER packet and the bit index forwarding table, and the next-hop node does not need to be determined based on a plurality of entries delivered by the control plane, thereby improving BIER packet forwarding efficiency.

In a possible implementation, the bit index forwarding table of the first network device includes a first forwarding bit mask and an identifier of a next-hop node corresponding to the first forwarding bit mask, and there is at least one next-hop node corresponding to the first forwarding bit mask. A manner in which the first network device queries the bit index forwarding table of the first network device based on the bit string, to obtain a next-hop node corresponding to the target bit in the plurality of next-hop nodes of the first network device includes but is not limited to: querying the bit index forwarding table for a first forwarding bit mask corresponding to any target bit of the bit string; and using a next-hop node corresponding to the found first forwarding bit mask as a next-hop node corresponding to the any target bit in the plurality of next-hop nodes of the first network device.

In a possible implementation, when the bit index forwarding table is queried for the first forwarding bit mask corresponding to the any target bit, query may be performed based on a location of the target bit in the bit string. In this case, that the first network device queries the bit index forwarding table for a first forwarding bit mask corresponding to any target bit includes: The first network device queries the bit index forwarding table for the corresponding first forwarding bit mask by using the location of the any target bit in the bit string as an index.

In a possible implementation, that the first network device determines, based on the next-hop node corresponding to the target bit, the target next-hop node that reaches the destination address of the first BIER packet includes: The first network device selects, based on a packet feature of the first BIER packet and a plurality of next-hop nodes corresponding to the any target bit in the bit string, one next-hop node from the plurality of next-hop nodes corresponding to the any target bit as one target next-hop node that reaches the destination address of the first BIER packet. The packet feature of the first BIER packet includes but is not limited to a quintuple hash value of the first BIER packet or a flow label and an entropy label of the first BIER packet. A same next-hop node is selected for the first BIER packet with a same quintuple or a same flow label and entropy label. For example, one next-hop node is selected based on the quintuple hash value of the first BIER packet or the flow label and the entropy label of the first BIER packet from the plurality of next-hop nodes corresponding to the any target bit as one target next-hop node that reaches the destination address of the first BIER packet.

In a possible implementation, the target forwarding table includes a correspondence between an identifier of the target next-hop node and a second forwarding bit mask, and that the first network device generates a target forwarding table based on the target next-hop node includes: On the basis of there being a plurality of target next-hop nodes, the first network device obtains the target forwarding table based on the plurality of target next-hop nodes and second forwarding bit masks respectively corresponding to the plurality of target next-hop nodes, where identical target next-hop nodes in the plurality of target next-hop nodes correspond to a same forwarding entry, and a second forwarding bit mask in the same forwarding entry is obtained by combining first forwarding bit masks corresponding to the identical target next-hop nodes.

In a possible implementation, that the first network device forwards the first BIER packet based on the target forwarding table includes: obtaining, based on the first BIER packet, a second BIER packet corresponding to the target next-hop node in the target forwarding table. Then, the first network device sends the second BIER packet corresponding to the target next-hop node to the target next-hop node. For example, when sending the BIER packet to the next-hop node, the first network device performs an AND operation on the bit string in the BIER packet and an FBM field of an entry corresponding to the next-hop node in the forwarding table.

In a possible implementation, the target forwarding table includes a correspondence between an identifier of the target next-hop node and a second forwarding bit mask, and that the first network device obtains, based on the first BIER packet, a second BIER packet corresponding to the target next-hop node in the target forwarding table includes: The first network device replicates the first BIER packet based on a quantity of target next-hop nodes in the target forwarding table, to obtain a plurality of first BIER packets whose quantity is the same as the quantity of target next-hop nodes. Then, for any target next-hop node, the first network device modifies, based on a second forwarding bit mask corresponding to the any target next-hop node, one first BIER packet in the plurality of first BIER packets, to obtain a second BIER packet corresponding to the any target next-hop node.

According to a second aspect, a device for load balancing in a BIER network is provided. The device for load balancing includes units configured to perform the method for load balancing in a BIER network provided in any one of the first aspect or the possible implementations of the first aspect. For example, the device includes a processing unit and a sending unit. The processing unit is configured to: obtain a first BIER packet, determine, based on an identifier in the first BIER packet, a target next-hop node that reaches a destination address of the first BIER packet from a plurality of next-hop nodes of the device, and generate a target forwarding table based on the target next-hop node. The sending unit is configured to forward the first BIER packet based on the target forwarding table.

According to a third aspect, a device for load balancing in a bit index explicit replication network is provided. The device includes a communication interface, a memory, and a processor. The communication interface is configured to implement communication between the device and another device, for example, configured to receive or send a BIER packet. The memory stores at least one instruction. The processor loads the at least one instruction and performs steps related to the method for load balancing in a BIER network provided in any one of the first aspect or the possible implementations of the first aspect. For example, the processor of the device is configured to: obtain a first BIER packet, determine, based on an identifier in the first BIER packet, a target next-hop node that reaches a destination address of the first BIER packet from a plurality of next-hop nodes of the device, and generate a target forwarding table based on the target next-hop node. The communication interface of the device is configured to forward the first BIER packet based on the target forwarding table.

According to a fourth aspect, a system for load balancing in a bit index explicit replication network is provided. The system includes a first network device and a second network device. The first network device performs the method for load balancing in a BIER network provided in any one of the first aspect or the possible implementations of the first aspect. The second network device is configured to receive a BIER packet sent by the first network device.

According to a fifth aspect, a computer storage medium including computer program instructions is provided. When the computer program instructions are run on a device for load balancing in a BIER network, the device is enabled to perform the method for load balancing in a BIER network provided in any one of the first aspect or the possible implementations of the first aspect.

According to a sixth aspect, another communication apparatus is provided. The apparatus includes a transceiver, a memory, and a processor. The transceiver, the memory, and the processor communicate with each other by using an internal connection path. The memory is configured to store instructions. The processor is configured to execute the instructions stored in the memory, to control the transceiver to receive a BIER packet and control the transceiver to send a BIER packet. In addition, when the processor executes the instructions stored in the memory, the processor is enabled to perform the method in any one of the first aspect or the possible implementations of the first aspect.

In an example embodiment, there are one or more processors, and there are one or more memories.

In an example embodiment, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

According to a seventh aspect, a computer program is provided. The computer program (product) includes computer program code. When the computer program code is run by a computer, the computer is enabled to perform the method according to any one of the first aspect or the possible implementations of the first aspect.

According to an eighth aspect, a chip is provided, including a processor, configured to invoke, from a memory, and run instructions stored in the memory, so that a communication device on which the chip is disposed performs the method according to any one of the first aspect or the possible implementations of the first aspect.

DESCRIPTION OF EMBODIMENTS

Terms used in implementations of this application are only used to explain embodiments of this application, but are not intended to limit this application.

A BIER technology is a multicast technology. A BIER network includes an intermediate node and an edge node. The intermediate node is configured to communicate with another node inside the BIER network. The edge node can communicate with another node inside the BIER network. In addition, the edge node can further implement communication between the BIER network and another communication network. The BIER network may include one or more BIER domains. A bit forwarding router identifier (BFR-id) is configured for each edge node in the BIER network. For example, the BFR-id is configured as a value ranging from 1 to 256. Configuration information of each edge node in the BIER network may be flooded in the network in an interior gateway protocol (IGP) flooding manner. This type of information flooded with the IGP is referred to as BIER information. In a flooding manner, each node in the network can determine each BFR-id identifier and a corresponding node. The node in the BIER network in this application refers to a network device in the BIER network, and may be a data communication device such as a router or a switch.

Figure 1:
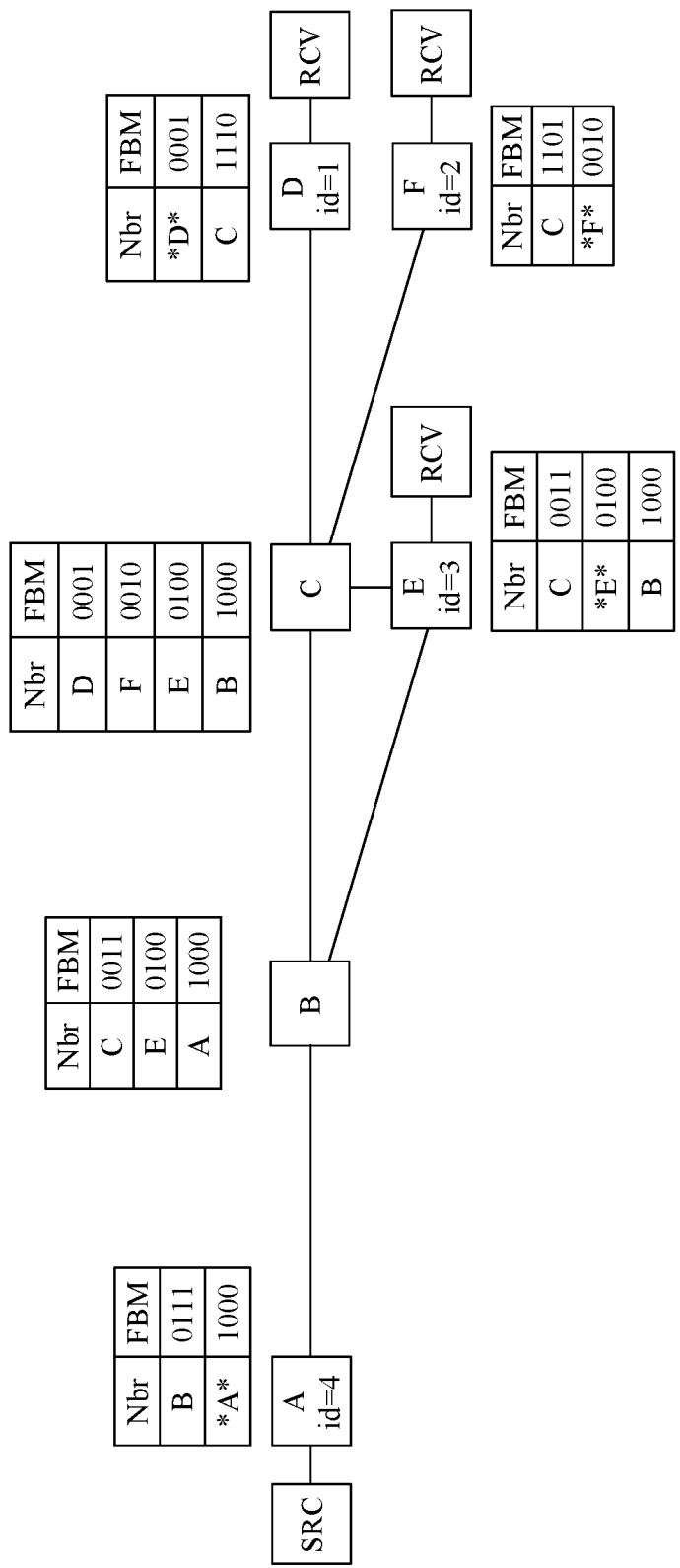
FIG. 1 is a schematic diagram of a structure of a network topology according to an embodiment of this application.

FIG. 1 is a schematic diagram of a network in which BIER information is flooded with the IGP. Edge nodes in the network include A, D, E, and F. As shown in FIG. 1, BFR-id values configured for the edge nodes A, D, E, and F are respectively 4, 1, 2, and 3. A BFR-id value of each edge node may be flooded through the IGP. For example, each edge node sends a control plane packet to another node in the network. The control plane packet includes flooding information, and the flooding information includes a BFR-id of the edge node, and further includes an internet protocol (IP) address and encapsulation information. The encapsulation information includes an encapsulation type. For example, flooding information of the edge node A carries a BFR-id, an IP address, and an encapsulation type: multi-protocol label switching (MPLS) of the edge node A, and an MPLS label allocated on the corresponding edge node A. Nodes B and C are intermediate nodes, and no BFR-id needs to be configured for them. Therefore, BFR-IDs in flooding information of control plane packets sent by the nodes B and C are accordingly set to 0. The flooding information of the control plane packets of the nodes B and C further includes other information such as an IP address and encapsulation information of the nodes.

Figure 2:
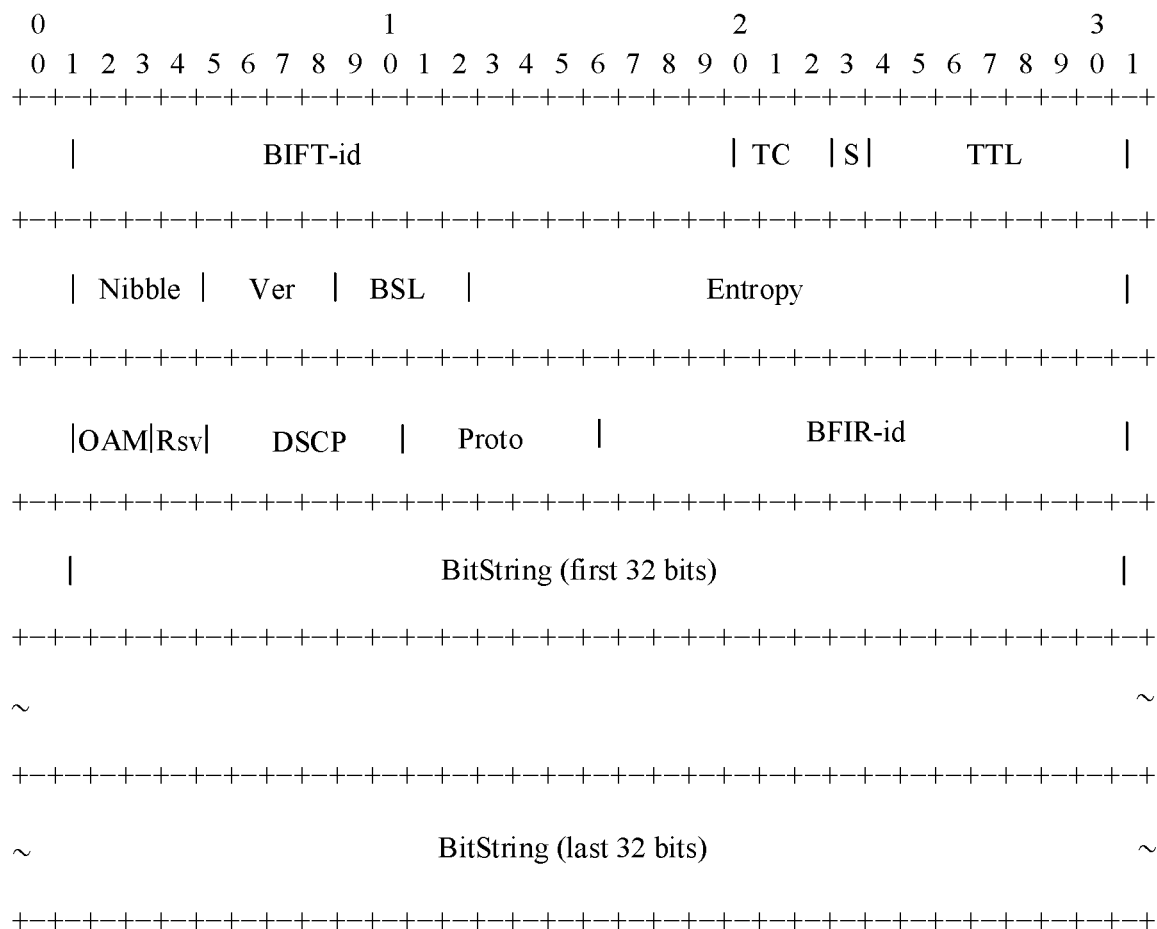
FIG. 2 is a schematic diagram of a structure of a BIER header according to an embodiment of this application.
Figure 3:
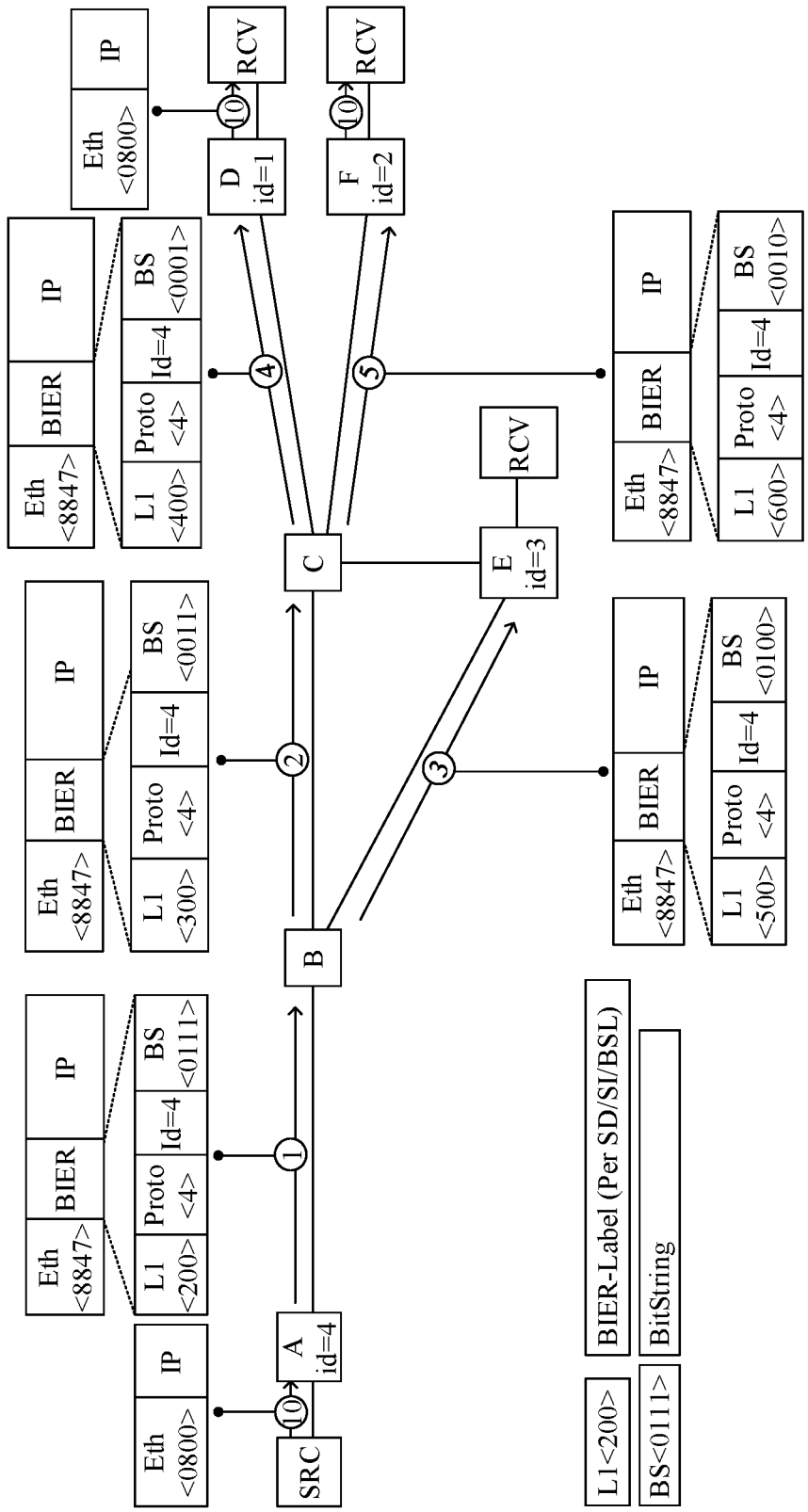
FIG. 3 is a schematic diagram of BIER-MPLS encapsulation and forwarding according to an embodiment of this application.

In addition, each node on the network establishes a forwarding table based on information flooded by a control plane over IGP, and each node may forward a BIER packet on a forwarding plane by using the forwarding table. For an encapsulation format of a BIER header, refer to descriptions of a BIER header format in the RFC 8296. As shown in FIG. 2, the BIER header includes a 32-bit (4-byte) BIER-Label (label) or bit index forwarding table identifier (BIFT-ID) value, where the first 20 bits are a label value or a BIFT-ID value, and the last 12 bits are other information of the label, including a traffic class (TC), an S bit, and time to live (TTL). The BIER header further includes other fields of 64 bits (8 bytes), including a nibble, a version (Ver), a bit string length (BSL), entropy, operation, administration and maintenance (OAM), reserved (Rsv), a differentiated services point code (DSCP), a protocol (Proto), a bit forwarding ingress router identifier (BFIR-id), and the like, further including a bit string. A length of the bit string may be 64 bits, 128 bits, 256 bits, or the like. The BIER-Label or BFR-ID value may be used to determine the length of the bit string.

Each bit in the bit string field is used to identify an edge node, and the edge node is a bit forwarding egress router (BFER). For example, a least significant (rightmost) bit of the bit string is used to identify that a next-hop node is a node corresponding to BFR-id=1. The second bit to the right of the bit string is used to identify a node whose BFR-id is 2. For a forwarding table on which the forwarding plane forwards a BIER packet based, specific next-hop nodes to which the BIER packet needs to be sent are determined based on the bit string in the BIER packet. When a plurality of bits correspond to a same next-hop node, only one BIER packet is sent to the next-hop node.

For example, the nodes in FIG. 1 establish a BIER forwarding table. A neighbor in the forwarding table may be a directly connected neighbor in a network topology, or may be an indirectly connected neighbor, for example, an indirectly connected neighbor calculated according to section 6.9 of RFC 8279. For the edge node A, a neighbor of the edge node A includes the node B. In the network topology shown in FIG. 1, because a next-hop node of a BFER node with the BFR-id=1/2/3 is the node B, a neighbor entry of the edge node A is established:

Neighbor (Nbr)=B, forwarding bit mask (FBM)=0111

Each bit in the FBM indicates an edge node. If there are many edge nodes, the edge nodes may be divided into different sets. For a plurality of sets, the FBM includes bit strings of the plurality of sets. For example, there are 512 edge nodes in the network topology. The 512 edge nodes are divided into two sets: a set 0 and a set 1. One set uses a 256-bit bit string. In this case, an FBM of a neighbor may include two 256-bit bit strings: a bit string corresponding to the set 0 and a bit string corresponding to the set 1.

For the neighbor entry of the edge node A, when the first bit, the second bit, and the third bit to the right of the bit string in the BIER packet are 1, the edge node A sends the BIER packet to the neighboring node B. When the fourth bit to the right of the bit string in the BIER packet is 1 (for example, a BIER packet sent from the node B to the node A), the entry indicates to send the BIER packet to the node A. In FIG. 1, an *A* identifier indicates to send the BIER packet to the node A.

For the node B, neighbors of the node B include the edge node A, the node C, and the edge node E. Because a next-hop node of a BFER node with the BFR-id=1/2 is the node C, a BFER node with the BFR-id=3 is the edge node E, and a BFER node with the BFR-id=4 is the edge node A, a neighbor entry of the node B is established:

Nbr=C, FBM=0011
Nbr=E, FBM=0100
Nbr=A, FBM=1000

For the node C, neighboring nodes of the node C include the node B, the edge node E, the edge node F, and the edge node D. Because a BFER node with the BFR-id=1 is the edge node D, a BFER node with the BFR-id=2 is the edge node F, a BFER node with the BFR-id=3 is the edge node E, and a next-hop node of a BFER node with the BFR-id=4 is the node B, a neighbor entry of the node C is established:

Nbr=D, FBM=0001
Nbr=F, FBM=0010
Nbr=E, FBM=0100
Nbr=B, FBM=1000

For the edge node D, a neighboring node of the edge node D includes the node C. Because a next-hop node of a BFER node with the BFR-id=2/3/4 is the node C, a neighbor entry of the edge node D is established:

Nbr=C, FBM=1110

For the edge node E, neighboring nodes of the edge node E include the node B and the node C. Because a next-hop node of a BFER node with the BFR-id=1/2 is the node C, and a next-hop node of a BFER node with the BFR-id=4 is the node B, a neighbor entry of the edge node E is established:

Nbr=B, FBM=1000
Nbr=C, FBM=0011

For the edge node F, a neighboring node of the edge node F includes the node C. Because a next-hop node of a BFER node with the BFR-id=1/3/4 is the node C, a neighbor entry of the edge node F is established:

Nbr=C, FBM=1101

In the BIER network shown in FIG. 1, a packet forwarding process is as follows:

After receiving an IP packet, the node A encapsulates a BIER header. For example, in FIG. 1, a bit string in the BIER header encapsulated by the node A is 0111. Then, the node A forwards the packet according to Nbr=B and FBM=0111 in the BIER forwarding table. According to the forwarding table, the BIER packet is sent to the neighboring node B. After receiving the BIER packet, the node B determines, according to the bit string being 0111, that the BIER packet needs to be respectively sent to two neighbors, that is, the node C and the node E. When sending the packet to the node C, the node B performs an AND operation on the bit string in the BIER packet and an FBM field of an Nbr=C entry in the forwarding table. As shown in FIG. 1, the bit string is 0111 in the BIER packet received by the node B, and the FBM field of the Nbr=C entry is 0011 in the forwarding table of the node B, and an AND result is 0011. The node B changes the bit string in the BIER packet to 0011 and sends the BIER packet to the node C. Similarly, when sending the BIER packet to the node E, the node B changes the bit string in the BIER packet to 0100 and then sends the BIER packet. After receiving the BIER packet, the node E determines, according to bit string being 0100 in the BIER packet that the BIER packet needs to be sent to the node E (itself). Therefore, the node E decapsulates the BIER header, and then forwards the BIER packet according to an inner IP packet. For example, the inner IP packet may be sent to a multicast receiver (RCV) of the node E in FIG. 1. After receiving the BIER packet sent by the node B, the node C determines, according to the bit string being 0011, that the BIER packet needs to be sent to the node D and the node F. The node C changes the bit string in the BIER packet to 0001 and sends the BIER packet to the node D. The node D decapsulates the BIER header and forwards the packet according to the inner IP packet. For example, the node D sends the BIER packet to an RCV of the node D in FIG. 1. The node C changes the bit string in the BIER packet to 0010 and sends the BIER packet to the node F. The node F decapsulates the BIER header and forwards the packet according to the inner IP packet. For example, the BIER packet is sent to an RSV of the node F.

In addition, in the BIER network, if the network device supports the ECMP, a BIER multi-table manner may be used for load balancing. The ECMP means that there are a plurality of paths with identical overheads to a same destination address. An example in which a destination address reached by the BIER packet received by the first network device corresponds to five network devices: a BFER 1, a BFER 2, a BFER 3, a BFER 4, and a BFER 5, and in next-hop nodes of the first network device, a corresponding next-hop node (Nbr) reaching the five network devices is at least one of A, B, C, and D is used. A summarized neighbor relationship (BIFT Neighbor) of a forwarding table is that shown in Table 1 below.

TABLE 1

| | | BIFT neighbor | | | |
|---|---|---|---|---|---|
| BFER 5 | BFER 4 | BFER 3 | BFER 2 | BFER 1 | Nbr |
| | | 1 | 1 | 1 | A |
| | 1 | 1 | | 1 | B |
| 1 | | | | 1 | C |
| 1 | | | 1 | 1 | D |

A number "1" in the foregoing table indicates a next hop that can be reached. The foregoing table 1 indicates that there are four next-hop nodes from the first network device to the BFER 1, which are respectively A/B/C/D. There are two next-hop nodes to the BFER 2, which are respectively A/D. There are two next-hop nodes to the BFER 3, which are respectively A/B. There is one next-hop node to the BFER 4, which is B. There are two next-hop nodes to the BFER 5, which are respectively C/D.

Equal-cost paths from the first network device to the BFER 1, the BFER 2, the BFER 3, the BFER 4, and the BFER 5 may be selected from the foregoing next-hop nodes respectively. For example, A is selected from the next-hop node A/B/C/D from the first network device to the BFER 1, A is selected from the next-hop node A/D from the first network device to the BFER 2, A is selected from the next-hop node A/B from the first network device to the BFER 3, B is selected from the next-hop node B from the first network device to the BFER 4, and C is selected from the next-hop node C/D from the first network device to the BFER 5. In this case, an obtained ECMP Table 1 is that shown in the ECMP Table 1 in Table 2 below.

Similarly, other equal-cost paths from the first network device to the BFER 1, the BFER 2, the BFER 3, the BFER 4, and the BFER 5 may alternatively be selected from the foregoing next-hop nodes respectively. For example, B is selected from the next-hop node A/B/C/D from the first network device to the BFER 1, D is selected from the next-hop node A/D from the first network device to the BFER 2, B is selected from the next-hop node A/B from the first network device to the BFER 3, B is selected from the next-hop node B from the first network device to the BFER 4, and D is selected from the next-hop node C/D from the first network device to the BFER 5. In this case, an obtained ECMP Table 2 is that shown in the ECMP Table 2 in Table 2 below.

Similarly, other equal-cost paths from the first network device to the BFER 1, the BFER 2, the BFER 3, the BFER 4, and the BFER 5 may alternatively be selected from the foregoing next-hop nodes respectively. For example, C is selected from the next-hop node A/B/C/D from the first network device to the BFER 1, A is selected from the next-hop node A/D from the first network device to the BFER 2, A is selected from the next-hop node A/B from the first network device to the BFER 3, B is selected from the next-hop node B from the first network device to the BFER 4, and C is selected from the next-hop node C/D from the first network device to the BFER 5. In this case, an obtained ECMP Table 3 is that shown in the ECMP Table 3 in Table 2 below.

Similarly, other equal-cost paths from the first network device to the BFER 1, the BFER 2, the BFER 3, the BFER 4, and the BFER 5 may alternatively be selected from the foregoing next-hop nodes respectively. For example, D is selected from the next-hop node A/B/C/D from the first network device to the BFER 1, D is selected from the next-hop node A/D from the first network device to the BFER 2, B is selected from the next-hop node A/B from the first network device to the BFER 3, B is selected from the next-hop node B from the first network device to the BFER 4, and D is selected from the next-hop node C/D from the first network device to the BFER 5. In this case, an obtained ECMP Table 4 is that shown in the ECMP Table 4 in Table 2 below.

The ECMP table based on Table 1 and the specified method may be that shown in Table 2 below.

TABLE 2

| ECMP Table 1 | | | | | ECMP Table 2 | | | | | ECMP Table 3 | | | | | ECMP Table 4 | | | | | |
|---|---|---|---|---|---|---|---|---|---|---|---|---|---|---|---|---|---|---|---|---|
| 5 | 4 | 3 | 2 | 1 | 5 | 4 | 3 | 2 | 1 | 5 | 4 | 3 | 2 | 1 | 5 | 4 | 3 | 2 | 1 | |
| | | 1 | 1 | 1 | | | | | | | | 1 | 1 | | | | 1 | 1 | | A |
| | 1 | | | | | 1 | 1 | | 1 | | 1 | | | | | 1 | 1 | | | B |
| 1 | | | | | | | | | | 1 | | | | 1 | | | | | | C |
| | | | | | 1 | | | 1 | | | | | | | 1 | | | 1 | 1 | D |

Based on the ECMP tables shown in Table 2, the control plane splits the ECMP tables into a plurality of BIFTs and delivers the plurality of BIFTs to the forwarding plane. The forwarding plane may perform hash based on a feature of the BIER packet, select a BIFT entry, and then indicate BIER packet forwarding. To be specific, for the five BFERs shown in Table 2, there are four next-hop node links, two next-hop node links, or one next-hop node link respectively, and a total of four BIFTs may be required to evenly balance traffic. For example, for four BIFTs of a BIFT 1 to a BIFT 4 shown below, the four BIFTs are used to evenly distribute paths to the five BFERs in the four BIFTs. An ID in the BIFT 1 to the BIFT 4 indicates an identifier of a BFER. For example, an ID of 1 indicates the BFER 1, an ID of 2 indicates the BFER 2, an ID of 3 indicates the BFER 3, an ID of 4 indicates the BFER 4, and an ID of 5 indicates the BFER 5.

| BIFT 1 | | |
|---|---|---|
| ID | F-BM | NBR |
| 1 | 00001 | A |
| 2 | 00010 | A |
| 3 | 00100 | A |
| 4 | 01000 | B |
| 5 | 10000 | C |

| BIFT 2 | | |
|---|---|---|
| ID | F-BM | NBR |
| 1 | 00001 | B |
| 2 | 00010 | D |
| 3 | 00100 | B |
| 4 | 01000 | B |
| 5 | 10000 | D |

| BIFT 3 | | |
|---|---|---|
| ID | F-BM | NBR |
| 1 | 00001 | C |
| 2 | 00010 | A |
| 3 | 00100 | A |
| 4 | 01000 | B |
| 5 | 10000 | C |

| BIFT 4 | | |
|---|---|---|
| ID | F-BM | NBR |
| 1 | 00001 | D |
| 2 | 00010 | D |
| 3 | 00100 | B |
| 4 | 01000 | B |
| 5 | 10000 | D |

When a link between the first network device and the Nbr A fails, the BFER 1, the BFER 2, and the BFER 3 are affected, and load balancing links change, as shown in the following:

The next-hop node to the BFER 1 changes from A/B/C/D to B/C/D.
The next-hop node to the BFER 2 changes from A/D to D.
The next-hop node to the BFER 3 changes from A/B to B.
The next-hop node to the BFER 4 still includes B and remains unchanged.
The next-hop node to the BFER 5 still includes C/D and remains unchanged.

After the BIFT 1 to the BIFT 4 are updated, the updated BIFT 1 to the updated BIFT 4 are shown below.

| BIFT 1 | | |
|---|---|---|
| ID | F-BM | NBR |
| 1 | 00001 | B |
| 2 | 00010 | D |
| 3 | 00100 | B |
| 4 | 01000 | B |
| 5 | 10000 | C |

| BIFT 2 | | |
|---|---|---|
| ID | F-BM | NBR |
| 1 | 00001 | C |
| 2 | 00010 | D |
| 3 | 00100 | B |
| 4 | 01000 | B |
| 5 | 10000 | D |

| BIFT 3 | | |
|---|---|---|
| ID | F-BM | NBR |
| 1 | 00001 | D |
| 2 | 00010 | D |
| 3 | 00100 | B |
| 4 | 01000 | B |
| 5 | 10000 | C |

| BIFT 4 | | |
|---|---|---|
| ID | F-BM | NBR |
| 1 | 00001 | B |
| 2 | 00010 | D |
| 3 | 00100 | B |
| 4 | 01000 | B |
| 5 | 10000 | D |

It is easily found through the foregoing analysis that the plurality of BIFTs are used by the control plane for load balancing. Therefore, a quantity of BIFTs increases as a quantity of ECMP links increases. For example, if a BIER packet has four ECMPs to one destination address and three ECMPs to another destination address, the common multiple is used to obtain 12 BIFTs to achieve even load balancing. In this way, traffic to each destination address can be evenly balanced. If there are more links, more BIFTs need to be delivered. When a link fails, traffic forward switching needs to wait until the control plane refreshes the BIFT. As a result, a link switching rate is affected by the control plane refreshing the BIFT, and a benefit of fast switching cannot be obtained. When the failed link recovers, a packet loss or packet addition during back switching may occur because all BIFTs are refreshed. To be specific, regardless of the link failure or the link recovery, because all BIFT entries and leaf nodes in the SI need to be refreshed, BFER traffic that is unrelated to the failed link is affected, and a forward switching packet loss, a back switching packet loss, or back switching packet addition may occur.

Figure 4:
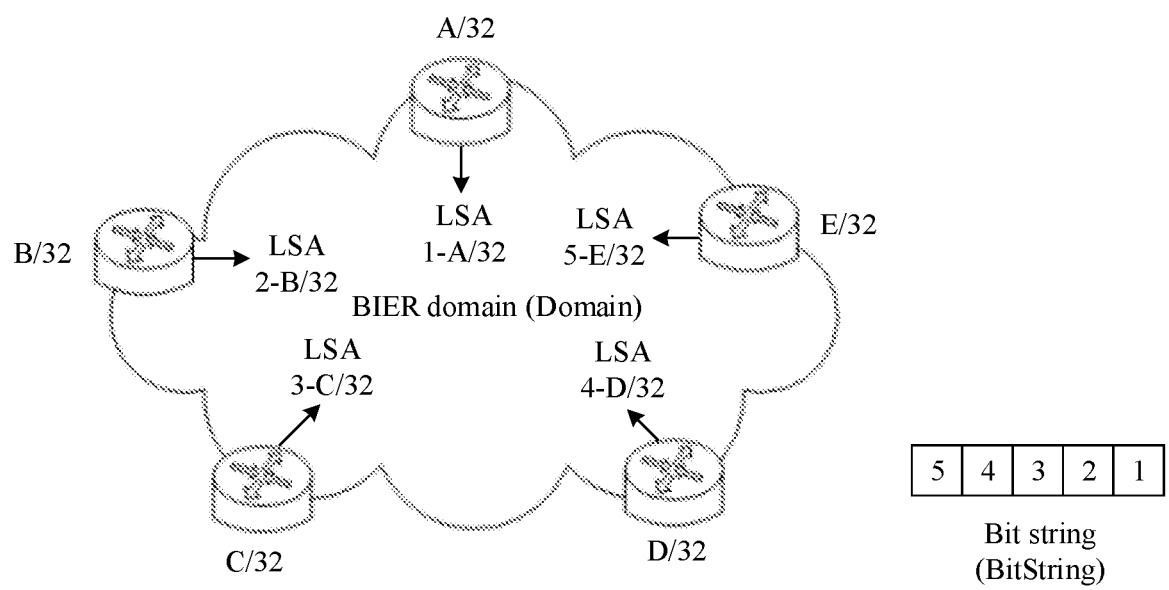
FIG. 4 is a schematic diagram of a structure of a network topology according to an embodiment of this application.

In view of this, an embodiment of this application provides a method for load balancing in a BIER network. The method may be applied to the system architecture or the application scenario shown in FIG. 4. As shown in FIG. 4, an application scenario of the method provided in this embodiment of this application is the BIER network, for example, in a BIER domain. The BIER domain includes five devices: A/32, B/32, C/32, D/32, and E/32. BFR identifiers (IDs) allocated to the five devices are respectively 1/2/3/4/5. A device may broadcast a link status of the device in the entire BIER domain through a link state advertisement (LSA).

Figure 5:
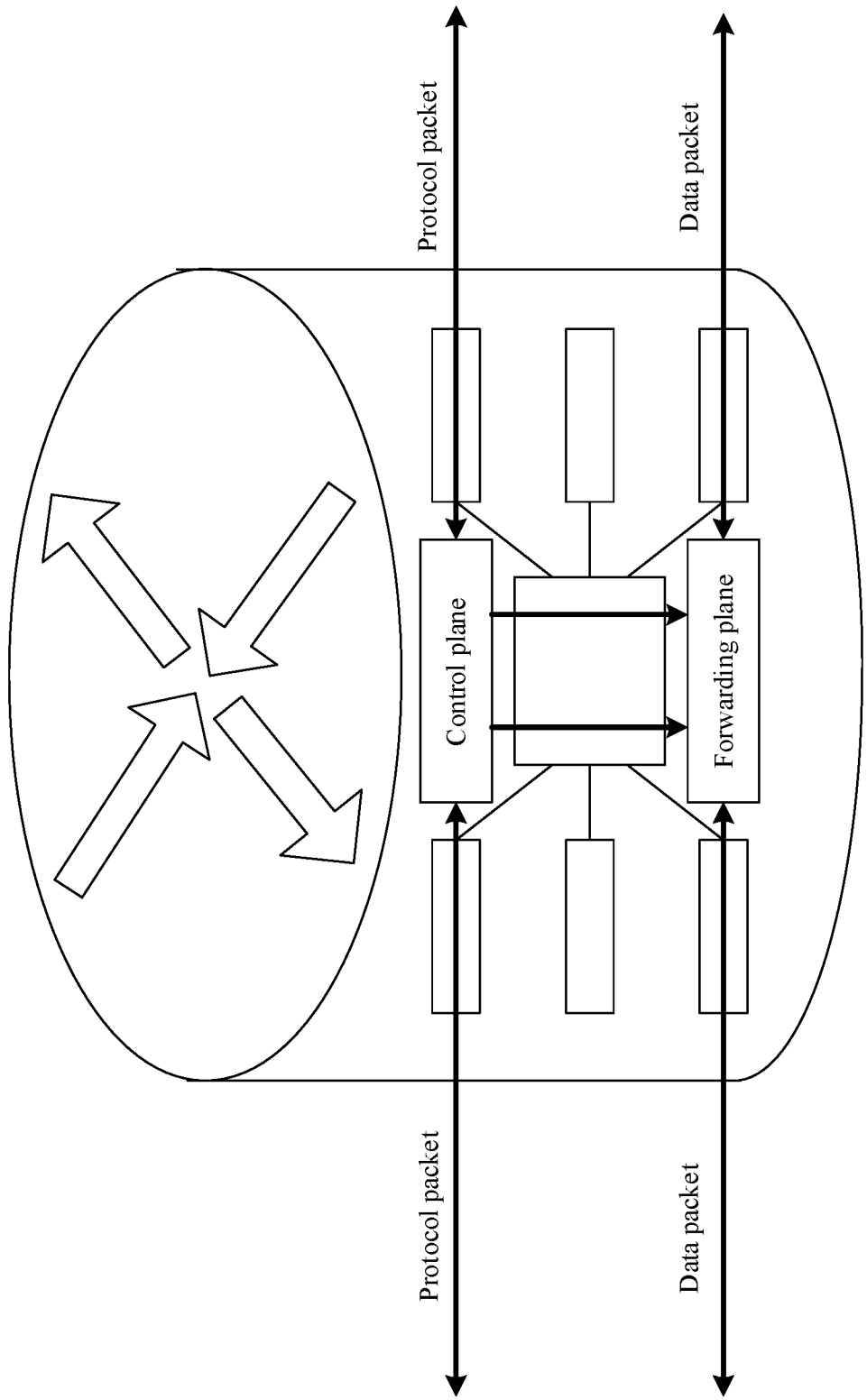
FIG. 5 is a schematic flowchart of processing of a control plane and a data plane of a router according to an embodiment of this application.

For example, for a case in which originally, the control plane distributes ECMP links to one destination node to different BIFTs in a multi-table manner, it is ensured that one destination node has only one next-hop node in one BIFT, so that a multi-replication case does not occur. In addition, for the link failure and recovery, forward switching and back switching are implemented by updating the BIFT by the control plane. As shown in FIG. 5, in the technical solution provided in this embodiment of this application, ECMP load balancing is not performed by the control plane in a multi-table manner, but is performed by the forwarding plane on an ECMP link of each BFER in a bit string of a packet. In addition, the forwarding plane performs forward switching and back switching when the link failure occurs. In this way, multicast can achieve the same load balancing precision as unicast and achieve the same forward switching and back switching performance as unicast.

Figure 6:
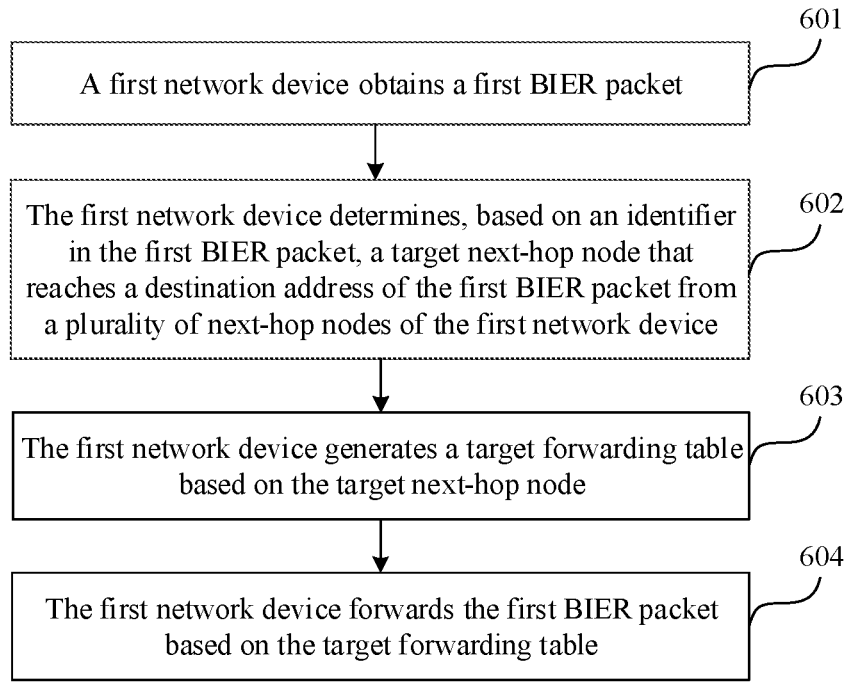
FIG. 6 is a flowchart of a method for load balancing in a BIER network according to an embodiment of this application.

Refer to FIG. 6. Load balancing of a first network device in a BIER network is used as an example. A method provided in an embodiment of this application includes the following processes.

601: The first network device obtains a first BIER packet.

In this embodiment of this application, an ECMP load balancing enabling function may be configured for a node in the BIER network. In other words, the first network device in this embodiment of this application may be any node for which the BIER ECMP load balancing enabling function is configured. For example, the first network device has a BIER protocol use capability, a BIER forwarding capability, and a forwarding capability of BIER encapsulation, for example, MPLS encapsulation, Ethernet encapsulation, or internet protocol version 6 (IPv6) encapsulation. An encapsulation type for BIER forwarding is not limited in this embodiment of this application. In addition, the first network device in this embodiment of this application may be a data communication device such as a router or a switch.

The first BIER packet obtained by the first network device may be a BIER packet sent by another BIER forwarding node to the first network device in the BIER network, or may be a BIER packet generated by encapsulating a BIER header by the first network device serving as a BIER ingress node of the first BIER packet. A manner in which the first network device obtains the first BIER packet is not limited in this embodiment of this application. With reference to FIG. 1, the first network device may be a node B, and the first BIER packet may be sent by a node A to the node B. The first network device may alternatively be a node A, and the first BIER packet may be a BIER packet generated by encapsulating the BIER header by the node A.

602: The first network device determines, based on an identifier in the first BIER packet, a target next-hop node that reaches a destination address of the first BIER packet from a plurality of next-hop nodes of the first network device.

Regardless of a specific manner in which the first network device obtains the first BIER packet, a BIER header format of the first BIER packet may be that shown in FIG. 2. A manner in which the first network device determines, based on an identifier in the first BIER packet, a target next-hop node that reaches a destination address of the first BIER packet from a plurality of next-hop nodes of the first network device includes but is not limited to: The first network device queries a bit index forwarding table of the first network device based on the identifier in the first BIER packet, to obtain the target next-hop node that reaches the destination address of the first BIER packet from the plurality of next-hop nodes of the first network device. The bit index forwarding table of the first network device may be delivered by a control plane of the first network device. Reaching the destination address of the BIER packet may be reaching a multicast receiver in FIG. 1.

For example, the identifier in the first BIER packet is a bit string, for example, a field bit string shown in FIG. 2. Each bit in the bit string is used to identify a BFER. For example, a least significant (rightmost) bit of the bit string is used to identify that a next-hop node is a node corresponding to BFR-id=1. The second bit to the right of the bit string is used to identify a node whose BFR-id is 2. Specific next-hop nodes to which the first BIER packet needs to be sent can be determined based on the bit string in the first BIER packet.

For example, the bit string includes at least one target bit of a first value, for example, the first value is 1. For example, the bit string in the first BIER packet is 11011. The bit string has five bits in total, and in a sequence from left to right, values of the first, second, fourth, and fifth bits are all the first value 1. In this case, the first, second, fourth, and fifth bits are all target bits. That the first network device queries a bit index forwarding table of the first network device based on the identifier in the first BIER packet, to obtain the target next-hop node that reaches the destination address of the first BIER packet from the plurality of next-hop nodes of the first network device includes: querying the bit index forwarding table of the first network device based on the bit string, to obtain a next-hop node corresponding to the target bit in the plurality of next-hop nodes of the first network device. The first network device determines, based on the next-hop node corresponding to the target bit, the target next-hop node that reaches the destination address of the first BIER packet.

For example, the bit index forwarding table of the first network device includes a first forwarding bit mask and an identifier of a next-hop node corresponding to the first forwarding bit mask, and there is at least one next-hop node corresponding to the first forwarding bit mask. That the first network device queries the bit index forwarding table of the first network device based on the bit string, to obtain a next-hop node corresponding to the target bit in the plurality of next-hop nodes of the first network device includes: The first network device queries the bit index forwarding table for a first forwarding bit mask corresponding to any target bit; and using a next-hop node corresponding to the found first forwarding bit mask as a next-hop node corresponding to the any target bit in the plurality of next-hop nodes of the first network device.

For example, the first network device is a device S, and the bit string in the first BIER packet received by the device S is 11011. For the device S, there is a BIFT neighbor table shown in Table 3. E/F/G/H/J are five BFERs, BFR identifiers (IDs) allocated to the five BFERs are respectively 5/4/3/2/1, and A/B/C/D is a next-hop node in the bit index forwarding table.

TABLE 3

| E(10000) | F(01000) | G(00100) | H(00010) | J(00001) | Nbr |
|---|---|---|---|---|---|
|  |  | 1 | 1 | 1 | A |
|  | 1 | 1 |  | 1 | B |

TABLE 3-continued

| E(10000) | F(01000) | G(00100) | H(00010) | J(00001) | Nbr |
|---|---|---|---|---|---|
| 1 |  |  |  | 1 | C |
| 1 |  |  | 1 | 1 | D |

It can be learned from the foregoing Table 3 that the device S has four equal-cost paths to the BFER-J, and corresponding next-hop nodes are respectively BFR-A, BFR-B, BFR-C, and BFR-D. There are two equal-cost paths to the BFER-H, and the corresponding next-hop nodes are respectively BFR-A and BFR-D. There are two equal-cost paths to the BFER-G, and the corresponding next-hop nodes are respectively BFR-A and BFR-B. There is one equal-cost path to the BFER-F, and the corresponding next-hop node is BFR-B. There are two equal-cost paths to the BFER-E, and the corresponding next-hop nodes are respectively BFR-C and BFR-D. The BIFT obtained by the device S is that shown in Table 4:

TABLE 4

| ID | F-BM | NBR |
|---|---|---|
| 1 | 00001 | A |
|  |  | B |
|  |  | C |
|  |  | D |
| 2 | 00010 | A |
|  |  | D |
| 3 | 00100 | A |
|  |  | B |
| 4 | 01000 | B |
| 5 | 10000 | C |
|  |  | D |

The bit string has five bits in total, and in a sequence from left to right, values of the first, second, fourth, and fifth bits are all the first value 1. In this case, the first, second, fourth, and fifth bits are all target bits. The bit index forwarding table may be queried for first forwarding bit masks corresponding to the several target bits. For the BIFT shown in Table 4, one FBM corresponds to at least one next-hop node. For example, that the first network device queries the bit index forwarding table for a first forwarding bit mask corresponding to any target bit includes: The first network device queries the bit index forwarding table for the corresponding first forwarding bit mask by using a location of the any target bit in the bit string as an index.

An example in which the location in the bit string is the first bit from left to right is used. The BIFT shown in Table 4 is queried. In the BIFT, an FBM whose first bit is 1 from left to right is an F-BM 10000 corresponding to an ID number 5. In the BIFT, next-hop nodes corresponding to the F-BM 10000 are respectively C and D. An example in which the location in the bit string is the second bit from left to right is used. The BIFT shown in Table 4 is queried. In the BIFT, an FBM whose second bit is 1 from left to right is an F-BM 01000 corresponding to an ID number 4. In the BIFT, a next-hop node corresponding to the F-BM 01000 is B. An example in which the location in the bit string is the fourth bit from left to right is used. The BIFT shown in Table 4 is queried. In the BIFT, an FBM whose fourth bit is 1 from left to right is an F-BM 00010 corresponding to an ID number 2. In the BIFT, next-hop nodes corresponding to the F-BM 00010 are respectively A and D. An example in which the location in the bit string is the fifth bit from left to right is used. The BIFT shown in Table 4 is queried. In the BIFT, an FBM whose fifth bit is 1 from left to right is an F-BM 00001 corresponding to an ID number 1. In the BIFT, next-hop nodes corresponding to the F-BM 00001 are respectively A, B, C and D.

In the foregoing case in which the target bit corresponds to a plurality of next-hop nodes in the next-hop nodes that correspond to each target bit and that are determined based on each target bit. In this case, that the first network device determines, based on the next-hop node corresponding to the target bit, the target next-hop node that reaches the destination address of the first BIER packet includes: The first network device selects, based on a packet feature of the first BIER packet and in response to a plurality of next-hop nodes corresponding to the any target bit, one next-hop node from the plurality of next-hop nodes corresponding to the any target bit as one target next-hop node that reaches the destination address of the first BIER packet.

For example, the packet feature of the first BIER packet includes but is not limited to a quintuple hash value or a seven-tuple hash value of the first BIER packet or a flow label and an entropy label of the first BIER packet. In this case, that the first network device selects, based on a packet feature of the first BIER packet, one next-hop node from the plurality of next-hop nodes corresponding to the any target bit as one target next-hop node that reaches the destination address of the first BIER packet includes: selecting, based on the quintuple hash value of the first BIER packet or the flow label and the entropy label of the first BIER packet, one next-hop node from the plurality of next-hop nodes corresponding to the any target bit as one target next-hop node that reaches the destination address of the first BIER packet. A same next-hop node is selected for the first BIER packet with a same quintuple or a same flow label and entropy label.

For example, for the first target bit, the next-hop nodes corresponding to the F-BM 10000 in the BIFT are respectively C and D. One next-hop node C is selected based on the packet feature of the first BIER packet from the next-hop nodes C and D as the target next-hop node corresponding to the first target bit. For the second target bit, because a corresponding next-hop node is only one node B, the node B is used as the target next-hop node corresponding to the second target bit. For the fourth target bit, the next-hop nodes corresponding to the F-BM 00010 in BIFT are respectively A and D. One next-hop node A is selected based on the packet feature of the first BIER packet from the next-hop nodes A and D as the target next-hop node corresponding to the fourth target bit. For the fifth target bit, the next-hop nodes corresponding to the F-BM 00001 in the BIFT are respectively A, B, C, and D. One next-hop node C is selected based on the packet feature of the first BIER packet from the next-hop nodes A, B, C, and D as the target next-hop node corresponding to the fifth target bit.

It should be noted that, when the target next-hop node corresponding to each target bit is determined, the target next-hop node corresponding to each target bit may be sequentially determined in a location sequence of each target bit in the bit string, or may be determined in no sequence. This is not limited in this embodiment of this application.

603: The first network device generates a target forwarding table based on the target next-hop node.

The forwarding table includes a correspondence between an identifier of the target next-hop node and a second forwarding bit mask. That the first network device generates a target forwarding table based on the target next-hop node includes: In response to there being a plurality of target next-hop nodes, the first network device obtains the forwarding table based on the plurality of target next-hop nodes and second forwarding bit masks respectively corresponding to the plurality of target next-hop nodes, where identical target next-hop nodes in the plurality of target next-hop nodes correspond to a same forwarding entry, and a second forwarding bit mask in the same forwarding entry is obtained by combining first forwarding bit masks corresponding to the identical target next-hop nodes.

The target next-hop node corresponding to each target bit determined in 602 is still used as an example, the obtained plurality of target next-hop nodes and the first forwarding bit mask corresponding to each target next-hop node are respectively those shown in Table 5 below.

TABLE 5

| F-BM | NBR |
|---|---|
| 00001 | C |
| 00010 | A |
| 00100 | B |
| 10000 | C |

Because there are two identical target next-hop nodes C, first forwarding bit masks corresponding to the node C are combined to obtain a combined second forwarding bit mask 10001. In this case, the target forwarding table obtained for the first BIER packet is that shown in Table 6 below.

TABLE 6

| F-BM | NBR |
|---|---|
| 10001 | C |
| 00010 | A |
| 00100 | B |

604: The first network device forwards the first BIER packet based on the target forwarding table.

In a possible implementation, that the first network device forwards the first BIER packet based on the target forwarding table includes: The first network device obtains a second BIER packet based on the first BIER packet, where the second BIER packet is a second BIER packet corresponding to the target next-hop node in the target forwarding table. The first network device sends the second BIER packet corresponding to the target next-hop node to the target next-hop node.

In a possible implementation, that the first network device obtains, based on the first BIER packet, a second BIER packet corresponding to the target next-hop node in the target forwarding table includes: The first network device replicates the first BIER packet based on a quantity of target next-hop nodes in the target forwarding table, to obtain a plurality of first BIER packets whose quantity is the same as the quantity of target next-hop nodes; and modifies one first BIER packet in the plurality of first BIER packets based on a second forwarding bit mask corresponding to the any target next-hop node, to obtain a second BIER packet corresponding to the any target next-hop node.

An example in which the foregoing determined target next-hop nodes are nodes A, B, and C is still used. The first network device replicates two first BIER packets, to obtain a total of three first BIER packets. A bit string of one of the first BIER packets is modified to 10001 based on the target next-hop node C, and an obtained second BIER packet is sent to the next-hop node C. A bit string of one of the first BIER packets is modified to 00010 based on the target next-hop node A, and an obtained second BIER packet is sent to the next-hop node A. A bit string of one of the first BIER packets is modified to 00010 based on the target next-hop node B, and an obtained second BIER packet is sent to the next-hop node B.

For ease of understanding the foregoing complete process, an example in which the first network device is a device S, an identifier in the first BIER packet received by the device S is a bit string, and the bit string is 11011 is used below to describe the method provided in this embodiment of this application. The method for load balancing in the BIER network includes the following processes.

1. Use a location of the rightmost "1" of the bit string in the bit string, for example, an offset location being 1, as an index to query a BFR-S BIFT, and the BIFT is that shown in Table 4. A query result indicates that four next-hop node links are reachable. That is, four corresponding next-hop nodes are found. Then, route selection is performed based on the packet feature of the first BIER packet, for example, the quintuple hash value of the first BIER packet or the flow label and the entropy label of the first BIER packet, and a same next-hop node link is selected for packets with a same quintuple or a same flow label and entropy label. For example, a selection result is that the next-hop node is the node C. Then, the rightmost bit 1 in the bit string is cleared to 0. In this case, an updated bit string is 11010.
2. Determine whether the updated bit string in step 1 is 0. Because 11010 is not 0, step 1 is repeated to find the second target bit with a value of 1 on the right, where index=2, and the BFR-S BIFT is queried. After route selection for load balancing, it is learned that the next-hop node is the node A. Then, the rightmost bit 1 in the bit string is cleared to 0. In this case, an updated bit string is 11000.
3. Determine whether the updated bit string in step 2 is 0. Because 11000 is not 0, step 1 is repeated to find the fourth target bit with a value of 1 on the right, where index=4, and the BFR-S BIFT is queried. After route selection for load balancing, it is learned that the next-hop node is the node B. The rightmost bit 1 in the bit string is cleared to 0. In this case, an updated bit string is 10000.
4. Determine whether the updated bit string in step 3 is 0. Because 10000 is not 0, step 1 is repeated to find the fifth target bit with a value of 1 on the rightmost, where index=5, and the BFR-S BIFT is queried. After load balancing, it is learned that the next-hop node is the node C. Then, the rightmost bit 1 in the bit string is cleared to 0. In this case, an updated bit string is 00000.
5. Determine whether the updated bit string in step 4 is 0. In this case, the bit string is 0, and querying the table is stopped. The following information is obtained in this case:

| F-BM | NBR |
|---|---|
| 00001 | C |
| 00010 | A |
| 01000 | B |
| 10000 | C |

6. Combine the next-hop nodes selected in steps 1 to 5 above. A combination rule is that first forwarding bit masks of identical NBRs are combined together to obtain a second forwarding bit mask. Then, the first forwarding bit mask 00001 and the first forwarding bit mask 10000 are combined into the second forwarding bit mask 10001, where NBR=C; 00010 is not combined, where NBR=A; 01000 is not combined, where NBR=B. An uncombined first forwarding bit mask may be directly used as a second forwarding bit mask in the target forwarding table. In addition, the second forwarding bit mask in the target forwarding table corresponds to one next-hop node, and there is at least one target bit in the second forwarding bit mask. An example in which the target bit may be a bit with a value of 1. Content of the obtained target forwarding table is as follows:

| F-BM | NBR |
|---|---|
| 00010 | A |
| 01000 | B |
| 10001 | C |

7. Replicate one first BIER packet to a BFR C, modify bit string=10001 in the first BIER packet corresponding to the BFR C, and send an obtained second BIER packet to the BFR C. Replicate one first BIER packet to a BFR A, modify bit string=00010 in the first BIER packet corresponding to the BFR A, and send an obtained second BIER packet to the BFR A. Replicate one first BIER packet to a BFR B, modify bit string=01000 in the first BIER packet corresponding to the BFR B, and send an obtained second BIER packet to the BFR B.

Beneficial effects brought by the technical solutions of this application at least include: ECMP load balancing is not performed by the control plane in a multi-table manner, but is performed based on an ECMP link of each BFER of the identifier such as the bit string in the BIER packet. In this way, when a load balancing link fails and recovers, packet addition and a packet loss do not occur, and when the load balancing link fails and recovers, BFER traffic that is unrelated to the failed link is not in out of order, so that load balancing precision that is the same as that of unicast is achieved, and forward switching and back switching performance that is the same as that of unicast is achieved. In addition, according to the method provided in this embodiment of this application, a quantity of BIFT entries can be greatly reduced, and one SI needs only one BIFT.

Figure 7:
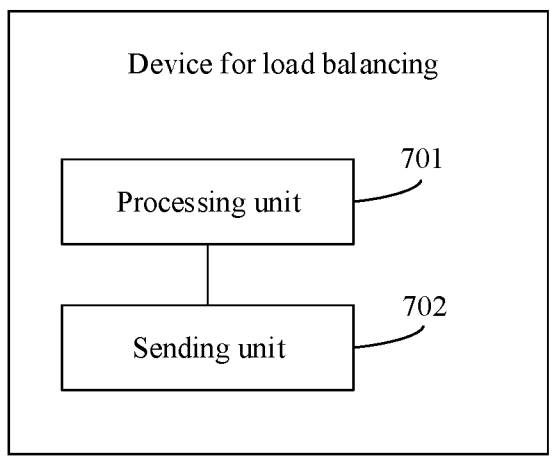
FIG. 7 is a schematic diagram of a structure of a device for load balancing in a BIER network according to an embodiment of this application.

FIG. 7 is a schematic diagram of a structure of a device for load balancing in a BIER network according to an embodiment of this application. The device may perform the method of the first network device in FIG. 6. Based on the following plurality of modules shown in FIG. 7, the device shown in FIG. 7 can perform all operations performed by the first network device shown in FIG. 6, and has a function of the first network device in FIG. 6. Refer to FIG. 7. The device includes the following units:

A processing unit 701 is configured to: obtain a first BIER packet, determine, based on an identifier in the first BIER packet, a target next-hop node that reaches a destination address of the first BIER packet from a plurality of next-hop nodes of the first network device, and generate a target forwarding table based on the target next-hop node. For example, the processing unit 701 is configured to perform content corresponding to steps 601 to 603 in FIG. 6.

A sending unit 702 is configured to forward the first BIER packet based on the target forwarding table. For example, the sending unit 702 is configured to perform content corresponding to step 604 in FIG. 6.

In a possible implementation, the processing unit 701 is configured to query a bit index forwarding table of the first network device based on the identifier in the first BIER packet, to obtain the target next-hop node that reaches the destination address of the first BIER packet from the plurality of next-hop nodes of the first network device.

In a possible implementation, the identifier in the first BIER packet is a bit string, and the bit string includes at least one target bit of a first value.

The processing unit 701 is configured to: query the bit index forwarding table of the first network device based on the bit string, to obtain a next-hop node corresponding to the target bit in the plurality of next-hop nodes of the first network device; and determine, based on the next-hop node corresponding to the target bit, the target next-hop node that reaches the destination address of the first BIER packet.

In a possible implementation, the bit index forwarding table of the first network device includes a first forwarding bit mask and an identifier of a next-hop node corresponding to the first forwarding bit mask, and there is at least one next-hop node corresponding to the first forwarding bit mask; and the processing unit 701 is configured to: query the bit index forwarding table for a first forwarding bit mask corresponding to any target bit; and use a next-hop node corresponding to the found first forwarding bit mask as a next-hop node corresponding to the any target bit in the plurality of next-hop nodes of the first network device.

In a possible implementation, the processing unit 701 is configured to query the bit index forwarding table for the corresponding first forwarding bit mask by using a location of the any target bit in the bit string as an index.

In a possible implementation, the processing unit 701 is configured to select, based on a packet feature of the first BIER packet and in response to a plurality of next-hop nodes corresponding to the any target bit, one next-hop node from the plurality of next-hop nodes corresponding to the any target bit as one target next-hop node that reaches the destination address of the first BIER packet.

In a possible implementation, the target forwarding table includes a correspondence between an identifier of the target next-hop node and a second forwarding bit mask, and the processing unit 701 is configured to: in response to there being a plurality of target next-hop nodes, obtain the target forwarding table based on the plurality of target next-hop nodes and second forwarding bit masks respectively corresponding to the plurality of target next-hop nodes, where identical target next-hop nodes in the plurality of target next-hop nodes correspond to a same forwarding entry, and a second forwarding bit mask in the same forwarding entry is obtained by combining first forwarding bit masks corresponding to the identical target next-hop nodes.

In a possible implementation, the processing unit 701 is configured to obtain, based on the first BIER packet, a second BIER packet corresponding to the target next-hop node in the target forwarding table.

The sending unit 702 is configured to send the second BIER packet corresponding to the target next-hop node to the target next-hop node, where the target next-hop node may be a plurality of different nodes.

In a possible implementation, the target forwarding table includes a correspondence between an identifier of the target next-hop node and a second forwarding bit mask, and the processing unit 701 is configured to: replicate the first BIER packet based on a quantity of target next-hop nodes in the target forwarding table, to obtain a plurality of first BIER packets whose quantity is the same as the quantity of target next-hop nodes; and for any target next-hop node, modify one first BIER packet in the plurality of first BIER packets based on a second forwarding bit mask corresponding to the any target next-hop node, to obtain a second BIER packet corresponding to the any target next-hop node.

According to the device for load balancing in the BIER network provided in this embodiment of this application, ECMP load balancing is not performed by a control plane in a multi-table manner, but is performed based on an ECMP link of each BFER of the identifier such as a bit string in the BIER packet. In this way, when a load balancing link fails and recovers, packet addition and a packet loss do not occur, and when the load balancing link fails and recovers, BFER traffic that is unrelated to the failed link is not in out of order, so that load balancing precision that is the same as that of unicast is achieved, and forward switching and back switching performance that is the same as that of unicast is achieved. In addition, according to the method provided in this embodiment of this application, a quantity of BIFT entries can be greatly reduced, and one SI needs only one BIFT.

It should be understood that, when the apparatus provided in FIG. 7 implements functions of the apparatus, division into the foregoing function modules is merely used as an example for description. During actual application, the foregoing functions may be allocated to different function modules for implementation based on a requirement. In other words, an inner structure of a device is divided into different function modules, to implement all or some of the functions described above. In addition, the apparatus embodiments and the method embodiments provided in the foregoing embodiments are based on a same concept. For specific implementation processes of the apparatus embodiments, refer to the method embodiments. Details are not described herein again.

Figure 8:
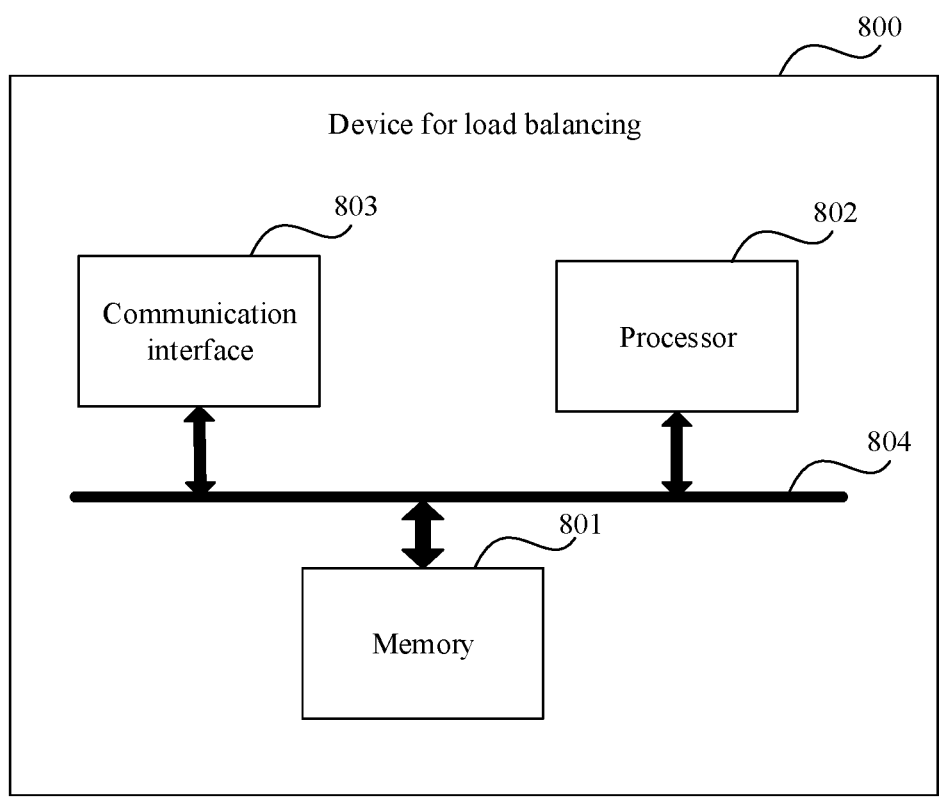
FIG. 8 is a schematic diagram of a structure of a device for load balancing in a BIER network according to an embodiment of this application.

In the foregoing embodiment, the network device, for example, the network device in the BIER network, may be a data communication device such as a router or a switch. A specific hardware structure may be implemented in two manners:

Manner 1: FIG. 8 is a schematic diagram of a structure of a device for load balancing in a BIER network according to an embodiment of this application. The device for load balancing 800 includes a communication interface 803, a processor 802, and a memory 801. The communication interface 803, the processor 802, and the memory 801 are connected by using a bus 804. The processor 802 is configured to perform the processing-related steps in 601 to 603 in the embodiment shown in FIG. 6, and has a function of the processing unit 701 in FIG. 7. The communication interface 803 is configured to receive and forward a packet, data information, and the like. For example, the communication interface 803 is configured to perform the processing step in 604 in the embodiment shown in FIG. 6, and has a function of the sending unit 702 in FIG. 7.

Figure 9:
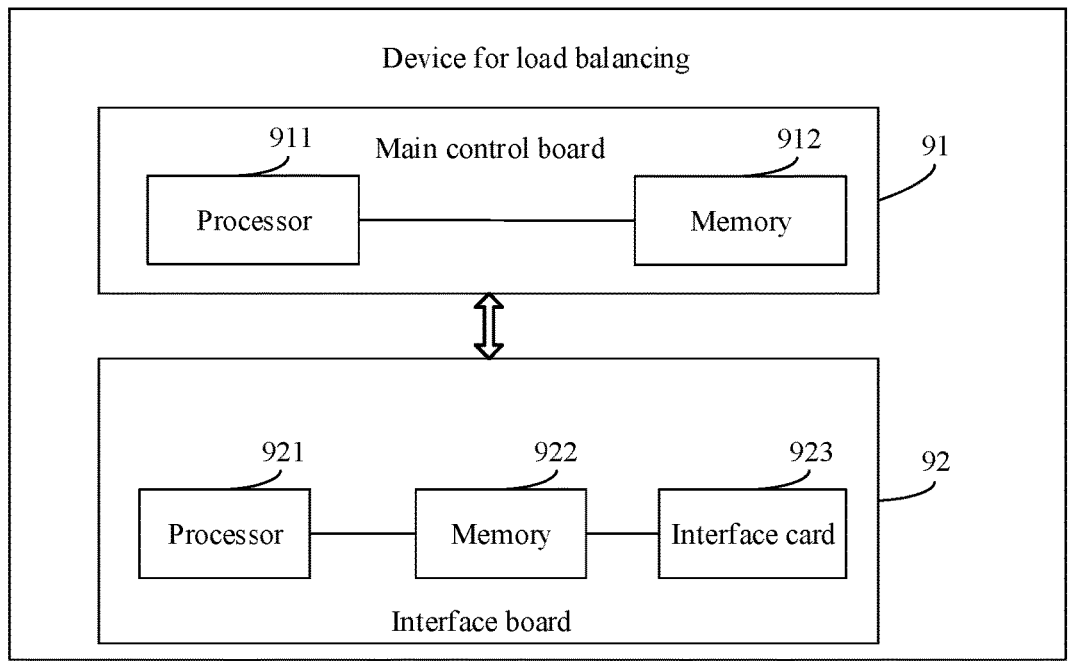
FIG. 9 is a schematic diagram of a structure of a device for load balancing in a BIER network according to an embodiment of this application.

Manner 2: FIG. 9 is a schematic diagram of a structure of a device for load balancing in a BIER network according to an embodiment of this application. The device for load balancing includes a main control board 91 and an interface board 92. The main control board 91 includes a processor 911 and a memory 912. The interface board 92 includes a processor 921, a memory 922, and an interface card 923. The processor 911 of the main control board 91 is configured to invoke program instructions in the memory 912 of the main control board 91 to perform a corresponding processing function. For example, the processor 911 of the main control board 91 invokes the program instructions in the memory 912 of the main control board 91 to perform the processing-related steps in 601 to 603 in the embodiment shown in FIG. 6. The processor 921 of the interface board 92 is configured to invoke program instructions in the memory 922 of the interface board 92 to receive and send a packet, for example, perform the processing step in 604 in the embodiment shown in FIG. 6.

The processor may be, for example, a central processing unit (CPU), a general-purpose processor, a digital signal processor (DSP), an application-specific integrated circuit (ASIC), a field programmable gate array (FPGA) or another programmable logic component, a transistor logic component, a hardware component, or any combination thereof. The processor may implement or execute various example logical blocks, modules, and circuits described with reference to content disclosed in embodiments of the present application. The processor may alternatively be a combination for implementing a computing function, for example, a combination of one or more microprocessors, or a combination of a DSP and a microprocessor.

The memory may be, for example, a volatile memory or a non-volatile memory, or may include both a volatile and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

Figure 10:
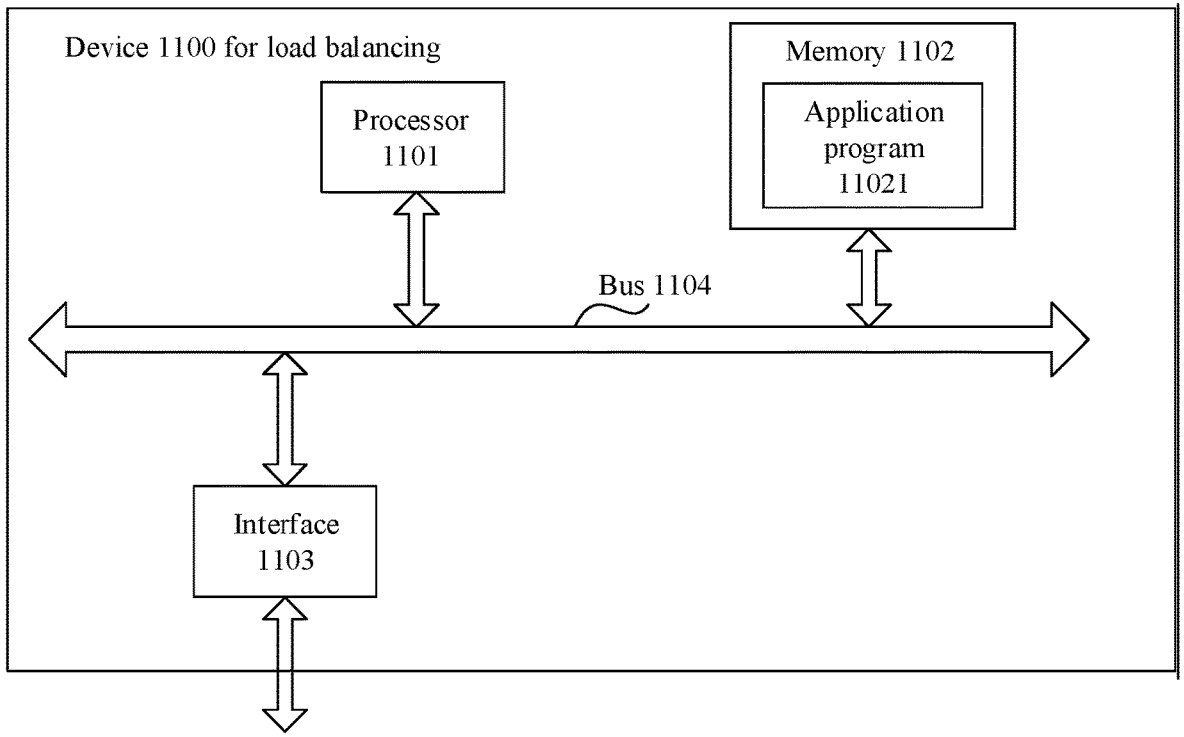
FIG. 10 is a schematic diagram of a structure of a device for load balancing in a BIER network according to an embodiment of this application.

FIG. 10 is a schematic diagram of a structure of a device 1100 for load balancing in a BIER network according to an embodiment of this application. The device 1100 shown in FIG. 10 may perform steps performed by the first network device in the embodiment shown in FIG. 6, and has corresponding functions.

As shown in FIG. 10, the device 1100 for load balancing in the BIER network includes a processor 1101, a memory 1102, an interface 1103, and a bus 1104. The processor 1101, the memory 1102, and the interface 1103 are connected through the bus 1104.

The interface 1103 may include a transmitter and a receiver, used by the device to receive and send a BIER packet. For example, the interface 1103 is configured to: support receiving a BIER packet sent by a neighboring node, and perform the processing steps in 604 in the embodiment shown in FIG. 6. The processor 1101 is configured to perform the processing-related steps in 601 to 603 in the embodiment shown in FIG. 6, and/or another process of the technology described in this specification. The memory 1102 includes an application program 11021, and is configured to store a program, code, or instructions. When executing the program, the code, or the instructions, the processor or a hardware device may complete the processing process related to the device 1100 for load balancing in the BIER network in the method embodiment in FIG. 6. For example, the memory 1102 may include a ROM and a RAM. The ROM includes a basic input/output system (BIOS) or an embedded system. The RAM includes an application program. When the device 1100 for load balancing in the BIER network needs to be run, the BIOS fixed in the ROM or a bootloader guidance system in the embedded system is used to boot and guide the device 1100 to enter a normal running state. After the device 1100 enters the normal running state, the application program in the RAM is run, to complete the processing process related to the device 1100 for load balancing in the BIER network in the method embodiment.

It may be understood that FIG. 10 merely shows a simplified design of the device 1100 for load balancing in the BIER network. During actual application, the device 1100 for load balancing in the BIER network may include any quantity of interfaces, processors, or memories.

It should be understood that the processor may be a CPU, or may be a processor such as a DSP. It should be noted that the processor may be a processor that supports an advanced reduced instruction set computing machine (ARM) architecture.

Further, in an optional embodiment, the memory may include a read-only memory and a random access memory, and provide instructions and data for the processor. The memory may further include a non-volatile random access memory. For example, the memory may further store device type information.

Figure 11:
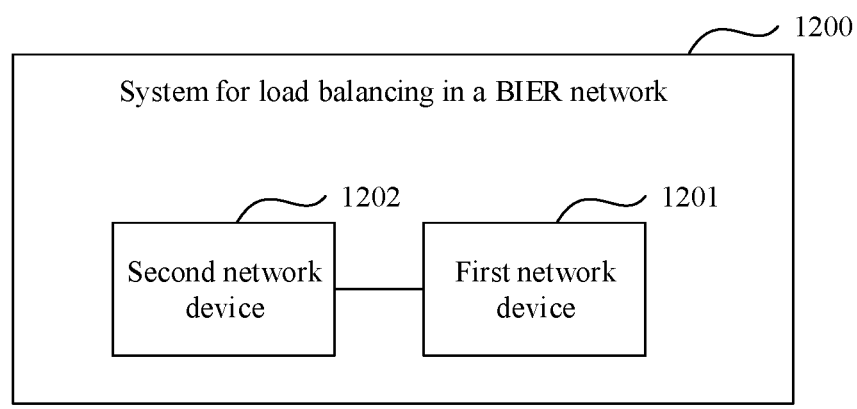
FIG. 11 is a schematic diagram of a structure of a system for load balancing in a BIER network according to an embodiment of this application.

FIG. 11 shows a system 1200 for load balancing in a BIER network according to an embodiment of this application. The system includes a first network device 1201 and a second network device 1202. The first network device 1201 may perform the method steps shown in FIG. 6, and has a function of the first network device in FIG. 6 and functions of the devices for load balancing in FIG. 7 to FIG. 10. The first network device and the second network device are network devices in a BIER network, and the second network device 1202 is configured to receive a BIER packet sent by the first network device. A quantity of devices included in the system is not limited in this embodiment of this application, and may be set based on an application scenario.

A computer-readable storage medium is further provided. The storage medium stores at least one instruction, and the instruction is loaded and executed by a processor, to implement the method for load balancing in a BIER network performed by the first network device in FIG. 6.

This application provides a computer program. When the computer program is executed by a computer, a processor or the computer may be enabled to perform corresponding steps and/or procedures in the method for load balancing in a BIER network performed by the first network device in FIG. 6.

It should be noted that any apparatus embodiment described above is merely an example. The units described as separate parts may or may not be physically separate, and parts displayed as units may or may not be physical units, and may be located in one place, or may be distributed on a plurality of network units. Some or all the modules may be selected according to an actual requirement to achieve the objectives of the solutions of embodiments. In addition, in the accompanying drawings of embodiments of a first network node or a controller provided in this application, a connection relationship between the modules indicates that there is a communication connection between the modules, and the communication connection may be specifically implemented as one or more communication buses or signal cables. A person of ordinary skill in the art may understand and implement embodiments of the present application without creative efforts.

Methods or algorithm steps described in the content disclosed in embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium or write information to the storage medium. Certainly, the storage medium may be a component of the processor. The processor and the storage medium may be located in an ASIC. In addition, the ASIC may be located in a core network interface device. Certainly, the processor and the storage medium may alternatively exist in a core network interface device as discrete components.

A person skilled in the art should be aware that in the foregoing one or more examples, functions described in this application may be implemented by using hardware, software, firmware, or any combination thereof. When software is used to implement the functions, these functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible by a general-purpose or dedicated computer.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

Objectives, technical solutions, and beneficial effects of this application are described in detail in the foregoing specific implementations. It should be understood that the foregoing descriptions are merely specific implementations of this application, and are not intended to limit the protection scope of this application. Any modification, equivalent replacement, improvement, and the like made based on the technical solutions of this application may fall within the protection scope of this application. The foregoing descriptions are merely specific implementations of the present application, but the protection scope of the present application is not limited thereto. Any variation or replacement within the technical scope disclosed in the present application that may be readily figured out by a person skilled in the art may fall within the protection scope of the present application.

What is claimed is:

1. A method for load balancing in a bit index explicit replication (BIER) network, wherein the method comprises:
   obtaining, by a first network device, a first BIER packet;
   determining, by the first network device based on an identifier in the first BIER packet, from a plurality of next-hop nodes of the first network device, a target next-hop node for reaching a destination address of the first BIER packet;
   generating, by the first network device, a target forwarding table based on the target next-hop node; and
   forwarding, by the first network device, the first BIER packet based on the target forwarding table;
   wherein determining the target next-hop node comprises:
   selecting, by the first network device, from a plurality of next-hop nodes corresponding to a respective target bit, one next-hop node as the target next-hop node based on a packet feature of the first BIER packet, wherein the packet feature comprises a hash value of the first BIER packet, and wherein the hash value is a quintuple hash value or a seven-tuple hash value.

2. The method according to claim 1, wherein determining the target next-hop node comprises:
   querying, by the first network device, a bit index forwarding table of the first network device based on the identifier in the first BIER packet to obtain the target next-hop node from the plurality of next-hop nodes of the first network device.

3. The method according to claim 2, wherein the identifier in the first BIER packet is a bit string, and the bit string comprises at least one target bit of a first value; and
   wherein querying the bit index forwarding table of the first network device comprises:
   querying, by the first network device, the bit index forwarding table based on the bit string to obtain a next-hop node corresponding to a target bit in the plurality of next-hop nodes of the first network device; and
   determining, by the first network device based on the next-hop node corresponding to the target bit, the target next-hop node.

4. The method according to claim 3, wherein the bit index forwarding table comprises a first forwarding bit mask and an identifier of a next-hop node corresponding to the first forwarding bit mask, and there is at least one next-hop node corresponding to the first forwarding bit mask; and
   wherein querying the bit index forwarding table of the first network device comprises:
   querying, by the first network device, the bit index forwarding table for a respective first forwarding bit mask corresponding to a respective target bit of the bit string; and
   using, by the first network device, a next-hop node corresponding to the respective first forwarding bit mask as a next-hop node corresponding to the respective target bit in the plurality of next-hop nodes of the first network device.

5. The method according to claim 4, wherein querying the bit index forwarding table for the respective first forwarding bit mask corresponding to the respective target bit of the bit string comprises:
   querying, by the first network device, the bit index forwarding table for the respective first forwarding bit mask by using a location of the respective target bit in the bit string as an index.

6. The method according to claim 1, wherein the target forwarding table comprises a correspondence between an identifier of the target next-hop node and a second forwarding bit mask; and
   wherein generating the target forwarding table based on the target next-hop node comprises: based on there being a plurality of target next-hop nodes, obtaining, by the first network device, the target forwarding table based on the plurality of target next-hop nodes and second forwarding bit masks respectively corresponding to the plurality of target next-hop nodes, wherein identical target next-hop nodes in the plurality of target next-hop nodes correspond to a same forwarding entry, and a second forwarding bit mask in the same forwarding entry is obtained by combining first forwarding bit masks corresponding to the identical target next-hop nodes.

7. The method according to claim 1, wherein forwarding the first BIER packet based on the target forwarding table comprises:
   obtaining, by the first network device based on the first BIER packet, a second BIER packet corresponding to the target next-hop node in the target forwarding table; and
   sending, by the first network device, the second BIER packet corresponding to the target next-hop node to the target next-hop node.

8. The method according to claim 7, wherein the target forwarding table comprises a correspondence between an identifier of the target next-hop node and a second forwarding bit mask; and
   wherein obtaining the second BIER packet corresponding to the target next-hop node in the target forwarding table comprises:
   replicating, by the first network device, the first BIER packet based on a quantity of target next-hop nodes in the target forwarding table to obtain one or more first BIER packets whose quantity is the same as the quantity of target next-hop nodes; and
   for a respective target next-hop node, performing an adjustment based on a second forwarding bit mask corresponding to the respective target next-hop node to obtain a second BIER packet corresponding to the respective target next-hop node.

9. The method according to claim 1, wherein the hash value is the quintuple hash value.

10. A device for load balancing in a bit index explicit replication (BIER) network, wherein the device comprises:
    a memory configured to store computer program instructions;
    a processor configured to execute the computer program instructions to:
    obtain a first BIER packet;
    determine, based on an identifier in the first BIER packet, from a plurality of next-hop nodes of the device, a target next-hop node for reaching a destination address of the first BIER packet; and
    generate a target forwarding table based on the target next-hop node; and
    a communication interface configured to forward the first BIER packet based on the target forwarding table generated by the processor;

wherein determining the target next-hop node comprises:
selecting, from a plurality of next-hop nodes corresponding to a respective target bit, one next-hop node as the target next-hop node based on a packet feature of the first BIER packet, wherein the packet feature comprises a hash value of the first BIER packet, and wherein the hash value is a quintuple hash value or a seven-tuple hash value.

11. The device according to claim 10, wherein the processor is further configured to query a bit index forwarding table of the device based on the identifier in the first BIER packet to obtain the target next-hop node.

12. The device according to claim 11, wherein the identifier in the first BIER packet is a bit string, and the bit string comprises at least one target bit of a first value; and
wherein the processor is further configured to:
query the bit index forwarding table based on the bit string to obtain a next-hop node corresponding to a target bit in the plurality of next-hop nodes of the device; and
determine, based on the next-hop node corresponding to the target bit, the target next-hop node.

13. The device according to claim 12, wherein the bit index forwarding table of the device comprises a first forwarding bit mask and an identifier of a next-hop node corresponding to the first forwarding bit mask, and there is at least one next-hop node corresponding to the first forwarding bit mask; and
wherein the processor is further configured to:
query the bit index forwarding table for a respective first forwarding bit mask corresponding to a respective target bit of the bit string; and
use a next-hop node corresponding to the respective first forwarding bit mask as a next-hop node corresponding to the respective target bit in the plurality of next-hop nodes of the device.

14. The device according to claim 13, wherein the processor is further configured to query the bit index forwarding table for the respective first forwarding bit mask by using a location of the respective target bit in the bit string as an index.

15. The device according to claim 10, wherein the target forwarding table comprises a correspondence between an identifier of the target next-hop node and a second forwarding bit mask; and
wherein the processor is further configured to, based on there being a plurality of target next-hop nodes, obtain the target forwarding table based on the plurality of target next-hop nodes and second forwarding bit masks respectively corresponding to the plurality of target next-hop nodes, wherein identical target next-hop nodes in the plurality of target next-hop nodes correspond to a same forwarding entry, and a second forwarding bit mask in the same forwarding entry is obtained by combining first forwarding bit masks corresponding to the identical target next-hop nodes.

16. The device according to claim 10, wherein the processor is further configured to obtain, based on the first BIER packet, a second BIER packet corresponding to the target next-hop node in the target forwarding table; and
wherein the communication interface is further configured to send the second BIER packet corresponding to the target next-hop node to the target next-hop node.

17. The device according to claim 16, wherein the target forwarding table comprises a correspondence between an identifier of the target next-hop node and a second forwarding bit mask; and
wherein the processor is further configured to:
replicate the first BIER packet based on a quantity of target next-hop nodes in the target forwarding table to obtain one or more first BIER packets whose quantity is the same as the quantity of target next-hop nodes; and
for a respective target next-hop node, perform adjustment based on a second forwarding bit mask corresponding to the respective target next-hop node, to obtain a second BIER packet corresponding to the respective target next-hop node.

18. The device according to claim 10, wherein the hash value is the seven-tuple hash value.

19. A non-transitory computer-readable medium having processor-executable instructions stored thereon for load balancing in a bit index explicit replication (BIER) network, wherein the processor-executable instructions, when executed, facilitate:
obtaining, by a first network device, a first BIER packet;
determining, by the first network device based on an identifier in the first BIER packet, from a plurality of next-hop nodes of the first network device, a target next-hop node for reaching a destination address of the first BIER packet;
generating, by the first network device, a target forwarding table based on the target next-hop node; and
forwarding, by the first network device, the first BIER packet based on the target forwarding table;
wherein determining the target next-hop node comprises:
selecting, by the first network device, from a plurality of next-hop nodes corresponding to a respective target bit, one next-hop node as the target next-hop node based on a packet feature of the first BIER packet, wherein the packet feature comprises a hash value of the first BIER packet, and wherein the hash value is a quintuple hash value or a seven-tuple hash value.

20. The non-transitory computer-readable medium according to claim 19, wherein the hash value is the quintuple hash value.

* * * * *